(12) United States Patent
Kung et al.

(10) Patent No.: US 8,929,447 B2
(45) Date of Patent: Jan. 6, 2015

(54) IMAGE DEBLURRING METHOD USING MOTION COMPENSATION

(75) Inventors: Chih-Hsien Kung, Tainan (TW); Chih-Ming Kung, Tainan (TW); Cheng-Han Shen, Tainan (TW); Chuan-Chun Ku, Hsinchu County (TW)

(73) Assignee: Chang Jung Christian University, Tainan (TW)

( * ) Notice: Subject to any disclaimer, the term of this patent is extended or adjusted under 35 U.S.C. 154(b) by 407 days.

(21) Appl. No.: 13/553,234

(22) Filed: Jul. 19, 2012

(65) Prior Publication Data

US 2014/0023141 A1    Jan. 23, 2014

(51) Int. Cl.
*H04N 7/12* (2006.01)
*H04N 11/02* (2006.01)
*H04N 11/04* (2006.01)

(52) U.S. Cl.
USPC .............................. 375/240.15; 375/E07.25

(58) Field of Classification Search
None
See application file for complete search history.

(56) References Cited

U.S. PATENT DOCUMENTS

2011/0229044 A1 *    9/2011    Yang et al. .................... 382/219

\* cited by examiner

*Primary Examiner* — Dave Czekaj
*Assistant Examiner* — Nam Pham
(74) *Attorney, Agent, or Firm* — Osha Liang LLP

(57) ABSTRACT

In an image deblurring method, an image processor determines an absolute difference between a pixel value of each pixel in a current image frame and a pixel value of a corresponding pixel in a reference image frame to obtain a total absolute difference corresponding to the current image frame by summing up the absolute differences corresponding respectively the pixels of the current image frame. When the total absolute difference is smaller than a predetermined first threshold value and not smaller than a predetermined third threshold value, the image processor generates an interpolated image frame based on the current and reference image frames using one of unidirectional motion estimation and bidirectional motion estimation.

5 Claims, 2 Drawing Sheets

IMAGE DEBLURRING METHOD USING MOTION COMPENSATION

BACKGROUND OF THE INVENTION

1. Field of the Invention

The invention relates to a deblurring method, and more particularly to a deblurring method using motion compensation.

2. Description of the Related Art

With the development of science and technology, display techniques become more and more advanced. In order to reduce the screen size, weight, and power consumption, liquid crystal displays (LCDs) have almost replaced traditional cathode ray tube (CRT) displays. In addition, since the size of LCDs gradually increases, enhanced resolution of LCDs is required to improve video quality. However, since LCDs have a relatively long response time and are driven by a hold-type manner, and also due to persistence of vision for human eyes, motion blur easily occurs.

In order to effectively solve the problem of motion blur for images of a fast moving object and enhance frame fluency, many methods for motion blur removal have been proposed, for example, by accelerating action of liquid crystal molecules, by reducing LCD response time, utilizing black frame insertion, utilizing frame interpolation, etc.

Black frame insertion technique involves inserting a black frame or an interpolation frame between two normal video frames to increase frame rate, which could be 120 Hz, 240 Hz or more for a high definition TV. As such, frame rate up-conversion (FRUC) has become the most commonly discussed research topic.

However, such frame insertion algorithm may result in incorrect compensation such that image deblurring cannot be achieved. Therefore, improvements may be made to the above techniques.

SUMMARY OF THE INVENTION

Therefore, an object of the present invention is to provide an image deblurring method using motion compensation that can effectively reduce motion blur in an image frame.

According to the present invention, there is provided an image deblurring method adapted for processing a current image frame and a reference image frame from a series of image frames using an image processor to generate an interpolated image frame. Each of the current image frame and the reference image frame includes a plurality of pixels each having a pixel value. The image deblurring method of the present invention comprises the steps of:

a) configuring the image processor to determine an absolute difference between the pixel value of each of the pixels in the current image frame and the pixel value of a corresponding one of the pixels in the reference image frame to obtain a total absolute difference corresponding to the current image frame by summing up the absolute differences corresponding respectively to the pixels of the current image frame;

b) configuring the image processor to determine a relationship between the total absolute difference obtained in step a), and predetermined first, second and third threshold values, the second threshold value being smaller than the first threshold value and greater than the third threshold value; and c) when the image processor determines in step b) that the total absolute difference obtained in step a) is smaller than the first threshold value and not smaller than the third threshold value, configuring the image processor to generate the interpolated image frame based on the current image frame and the reference image frame using one of unidirectional motion estimation and bidirectional motion estimation.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
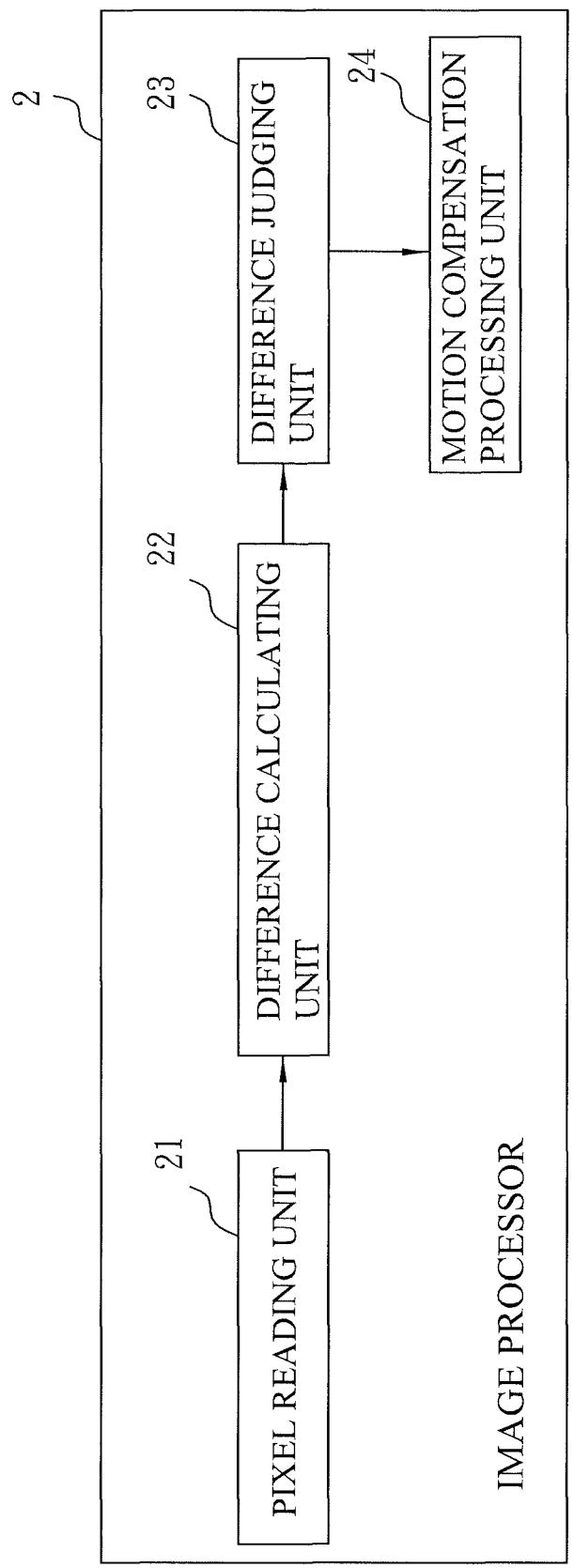
FIG. 1 is a schematic circuit block diagram of an image processor that is configured for implementing the preferred embodiment of an image deblurring method of the present invention.

Referring to FIG. 1, an image processor 2 is shown to include a pixel reading unit 21, a difference calculating unit 22, a difference judging unit 23, and a motion compensation processing unit 24. The image processor 2 is configured for processing a current image frame and a reference image frame from a series of image frames to generate an interpolated image frame according to the preferred embodiment of an image deblurring method of the present invention. Each image frame includes a plurality of pixels each having a pixel value. In this embodiment, each image frame has a resolution of 352×288, and the pixel value of each pixel of each image frame is a luminance value in a YUV color space.

The pixel reading unit 21 receives the series of image frames, and reads the pixel values of the pixels of each image frame received thereby.

The difference calculating unit 22 is connected electrically to the pixel reading unit 21 for determining an absolute difference between the pixel value of each of the pixels in the current image frame and the pixel value of a corresponding one of the pixels in the reference image frame to obtain a total absolute difference (TAD) corresponding to the current image frame by summing up the absolute differences corresponding respectively to the pixels of the current image frame. In this embodiment, the reference image frame is a previous image frame relative to the current image frame.

The difference judging unit 23 is connected electrically to the difference calculating unit 22 for determining a relationship between the total absolute difference (TAD) obtained by the difference calculating unit 22, and predetermined first, second and third threshold values (a, b, c). The second threshold value (b) is smaller than the first threshold value (a) and greater than the third threshold value (c), i.e., a>b>c. The first, second and third threshold values (a, b, c) are directly proportional to the resolution of each image frame. In this embodiment, the first, second and third threshold values (a, b, c) are 90000, 60000 and 10000, respectively. As such, the difference judging unit 23 generates a judging signal indicating the relationship determined thereby.

The motion compensation processing unit 24 is connected electrically to the difference judging unit 23 for receiving the judging signal therefrom. The motion compensation processing unit 24 is configure to select a motion compensation mode based on the judging signal such that the motion compensation processing unit 24 processes the current image frame and the reference image frame based on the motion compensation mode selected thereby to generate the interpolated image frame.

Figure 2:
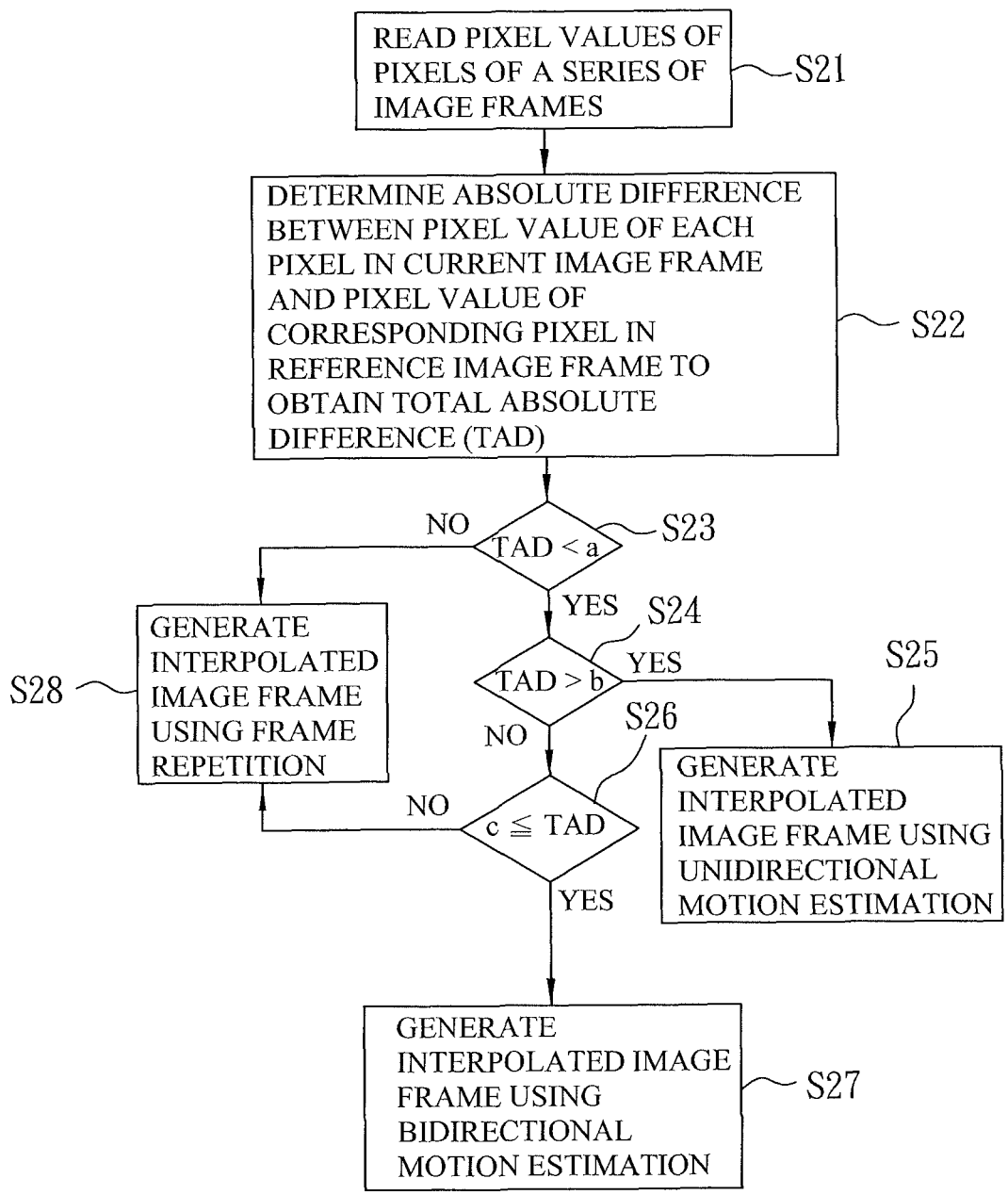
FIG. 2 is a flow chart of the preferred embodiment.

FIG. 2 is a flow chart of the preferred embodiment of the image deblurring method.

In step S21, the pixel reading unit 21 is configured to receive the series of image frames and read the pixel values of the pixels of each image frame.

In step S22, the difference calculating unit 22 is configured to determine an absolute difference between the pixel value of each pixel in the current image frame and the pixel value of a corresponding pixel in the reference image frame to obtain the total absolute difference (TAD) corresponding to the current image frame by summing up the absolute differences corresponding respectively to the pixels of the current image frame.

In step S23, the difference judging unit 23 is configured to determine whether the total absolute difference (TAD) is smaller than the first threshold value (a), i.e., TAD<a. If the result is affirmative, the flow proceeds to step S24. Otherwise, the flow goes to step S28.

In step S24, the difference judging unit 23 is configured to determine whether the total absolute difference (TAD) is greater than the second threshold value (b), i.e., TAD>b. If the result is affirmative, the flow proceeds to step S25. Otherwise, the flow goes to step S26.

In step S25, when b<TAD<a, the motion compensation processing unit 24 is configured to select unidirectional motion estimation as the motion compensation mode based on the judging signal from the difference judging unit 23 such that the motion compensation processing unit 24 generates the interpolated image frame based on the current image frame and the reference image frame using unidirectional motion estimation. Since the feature of this invention does not reside in unidirectional motion estimation, which is known to those skilled in the art, details of the same are omitted herein for the sake of brevity.

In step S26, the difference judging unit 23 is configured to determine whether the total absolute difference (TAD) is not greater than the third threshold value (c), i.e., c≤TAD. If the result is affirmative, the flow proceeds to step S27. Otherwise, the flow goes to step S28. When the difference judging unit 23 determines that c≤TAD≤b, the current image frame is a slow-motion frame.

In step S27, the motion compensation processing unit 24 is configured to select bidirectional motion estimation as the motion compensation mode based on the judging signal from the difference judging unit 23 such that the motion compensation processing unit 24 generates the interpolated image frame based on the current image frame and the reference image frame using bidirectional motion estimation. Preferably, the interpolated image frame is generated by the motion compensation processing unit 24 based on the current image frame and the reference image frame using bidirectional motion estimation in conjunction with overlapped block-based motion estimation. Similarly, since the feature of this invention does not reside in bidirectional motion estimation and overlapped block-based motion estimation, which are known to those skilled in the art, details of the same are omitted herein for the sake of brevity.

In step S28, when the total absolute difference (TAD) is not smaller than the first threshold value (a), i.e., TAD≥a, indicating the current image frame being a transition frame, or when the total absolute difference (TAD) is smaller the third threshold value (c), i.e., TAD<c, indicating the current image frame being a stationary frame, the motion compensation processing unit 24 is configured to select frame repetition as the motion compensation mode based on the judging signal from the difference judging unit 23 such that the motion compensation processing unit 24 generates the interpolated image frame based on the current image frame and the reference image frame using frame repetition through duplicating the reference image frame. Similarly, since the feature of this invention does not reside in frame repetition, which is known to those skilled in the art, details of the same are omitted herein for the sake of brevity.

Thereafter, the interpolated image frame generated by the image processor 2 is outputted prior to output of the current image frame, thereby reducing motion blur in the current image frame.

Table 1 shows experimental results of peak signal-to-noise ratio (PSNR) values for several test films obtained from the image deblurring method of this invention and first to five conventional image deblurring methods. The test films include an Akiyo film, a Mother film, a Coastguard film, a Mobile film, and a Stefan film that are downloaded from trace.eas.asu.edu/yuv. The first conventional image debludding method only using bidirectional motion estimation was proposed in an article by S. H. Lee, Y. C. Shin, S. Yang, H. H. Moon, and R. H. Park, "Adaptive motion-compensated interpolation for frame rate up-conversion," *IEEE Transactions on Consumer Electronics*, vol. 48, no. 3, pp. 444-450, August 2002. The second to fourth conventional image deblurring methods using bidirectional motion estimation in combination with overlapped block-based motion estimation (OBME) were proposed in four articles respectively by T. S. Chong, O. C. Au, W. S. Chau, and T. W. Chan, "Multiple objective frame rate up conversion," in Proc. of *IEEE Int. Conf. on Multimedia and Expo.*, pp. 253-256, July 2005, by K. Hilman, H. W. Park, and Y. Kim, "Using motion-compensated frame-rate conversion for the correction of 3:2 pull-down artifacts in video sequences," *IEEE Transactions on Circuits and Systems for Video Technology*, vol. 10, no. 6, pp. 869-877, September 2000, and by S. H. Lee, O. Kwon, and R. H. Park, "Weighted-adaptive motion-compensated frame rate up-conversion," *IEEE Transactions on Consumer Electronics*, vol. 49, no. 3, pp. 485-492, August 2003. The fifth conventional image deblurring method using forward motion estimation was proposed in an article by B. W. Jeon, G. I. Lee, S. H. Lee, and R. H. Park, "Coarse-to-fine frame interpolation for frame rate up-conversion using pyramid structure," *IEEE Transactions on Consumer Electronics*, vol. 49, no. 3, pp. 499-508, August 2003.

TABLE 1

| | method | | | | | |
|---|---|---|---|---|---|---|
| Test film | First method | Second method | Third method | Fourth method | Fifth method | Present invention |
| Akiyo | 44.582 | 32.307 | 38.788 | 45.927 | 41.645 | 48.797 |
| Mother | 29.386 | 33.795 | 34.620 | 35.922 | 39.119 | 42.583 |
| Coastguard | 28.509 | 25.189 | 29.773 | 32.415 | 29.012 | 36.845 |
| Mobile | 24.692 | 17.751 | 21.698 | 25.842 | 22.854 | 30.648 |
| Stefan | 23.826 | 19.907 | 22.277 | 23.898 | 22.386 | 25.232 |

From Table 1, the image deblurring method of this invention can obtain higher PSNR values compared to the conventional image deblurring methods. Therefore, the image deblurring method of this invention can effectively reduce motion blur in each image frame. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An image deblurring method adapted for processing a current image frame and a reference image frame from a series of image frames using an image processor to generate an interpolated image frame, each of the current image frame and the reference image frame including a plurality of pixels each having a pixel value, said image deblurring method comprising the steps of:
   a) configuring the image processor to determine an absolute difference between the pixel value of each of the pixels in the current image frame and the pixel value of a corresponding one of the pixels in the reference image frame to obtain a total absolute difference corresponding to the current image frame by summing up the absolute differences corresponding respectively to the pixels of the current image frame;
   b) configuring the image processor to determine a relationship between the total absolute difference obtained in step a), and predetermined first, second and third threshold values, the second threshold value being smaller than the first threshold value and greater than the third threshold value;
   c) when the image processor determines in step b) that the total absolute difference obtained in step a) is smaller than the first threshold value and not smaller than the third threshold value, configuring the image processor to generate the interpolated image frame based on the current image frame and the reference image frame using one of unidirectional motion estimation and bidirectional motion estimation; and
   d) when the image processor determines in step b) that the total absolute difference obtained in step a) is not smaller than the first threshold value or is smaller than the third threshold value, configuring the image processor to generate the interpolated image frame based on the current image frame and the reference image frame using frame repetition through duplicating the reference image frame.

2. The image deblurring method as claimed in claim 1, wherein, in step c):
   when the image processor determines in step b) that the total absolute difference obtained in step a) is greater than the second threshold value and smaller than the first threshold value, said one of the unidirectional motion estimation and the bidirectional motion estimation is the unidirectional motion estimation; and
   when the image processor determines in step b) that the total absolute difference obtained in step a) is not greater than the second threshold value and not smaller than the third threshold value, said one of the unidirectional motion estimation and the bidirectional motion estimation is the bidirectional motion estimation.

3. The image deblurring method as claimed in claim 2, wherein, in step c), when said one of the unidirectional motion estimation and the bidirectional motion estimation is the bidirectional motion estimation, the interpolated image frame is generated by the image processor based on the current image frame and the reference image frame using the bidirectional motion estimation in conjunction with overlapped block-based motion estimation.

4. The image deblurring method as claimed in claim 1, wherein the pixel value of each of the pixels of each of the current image frame and the reference image frame is a luminance value in a YUV color space.

5. The image deblurring method as claimed in claim 1, wherein the reference image frame is a previous image frame relative to the current image frame.

* * * * *